(12) United States Patent
Shimada

(10) Patent No.: US 7,352,599 B2
(45) Date of Patent: Apr. 1, 2008

(54) SWITCHING POWER SOURCE APPARATUS

(75) Inventor: Masaaki Shimada, Niiza (JP)

(73) Assignee: Sanken Electric Co., Ltd. (JP)

( * ) Notice: Subject to any disclaimer, the term of this patent is extended or adjusted under 35 U.S.C. 154(b) by 268 days.

(21) Appl. No.: 11/092,391

(22) Filed: Mar. 29, 2005

(65) Prior Publication Data

US 2005/0219866 A1 Oct. 6, 2005

(30) Foreign Application Priority Data

Mar. 30, 2004 (JP) ............................. 2004-100756

(51) Int. Cl.
*H02M 7/155* (2006.01)
(52) U.S. Cl. ......................................... 363/79; 363/89
(58) Field of Classification Search .................. 363/16, 363/78, 79, 84, 89, 125
See application file for complete search history.

(56) References Cited

U.S. PATENT DOCUMENTS 5,617,305 A * 4/1997 Numata ........................ 363/16
5,959,857 A * 9/1999 Nagahara .................... 363/132
5,973,946 A * 10/1999 Yasumura .................... 363/89
6,314,005 B1 * 11/2001 Nishi et al. ............... 363/21.08
6,373,735 B2 * 4/2002 Usui ............................ 363/89
6,882,551 B2 * 4/2005 Shimada et al. .............. 363/79
7,176,660 B2 * 2/2007 Usui et al. ................... 323/207

FOREIGN PATENT DOCUMENTS

JP 06-233524 8/1994
WO WO03/047080 A1 * 6/2003

* cited by examiner

*Primary Examiner*—Adolf Berhane
(74) *Attorney, Agent, or Firm*—Kilpatrick Stockton LLP

(57) ABSTRACT

A power-factor improving circuit applicable to a switching power source apparatus includes a rectifier having a diode bridge, a step-up reactor, a switching element, an output diode, a smoothing capacitor, a controller, and a variable reference voltage generator. If an error voltage from a conductance amplifier exceeds a second reference voltage, a comparator provides a high-level switching signal to turn on a switching element and bypass a resistor. As a result, a first reference voltage supplied to the conductance amplifier is switched from a low reference voltage to a high reference voltage. This results in adjusting an output voltage (Vout) to a low value.

10 Claims, 8 Drawing Sheets

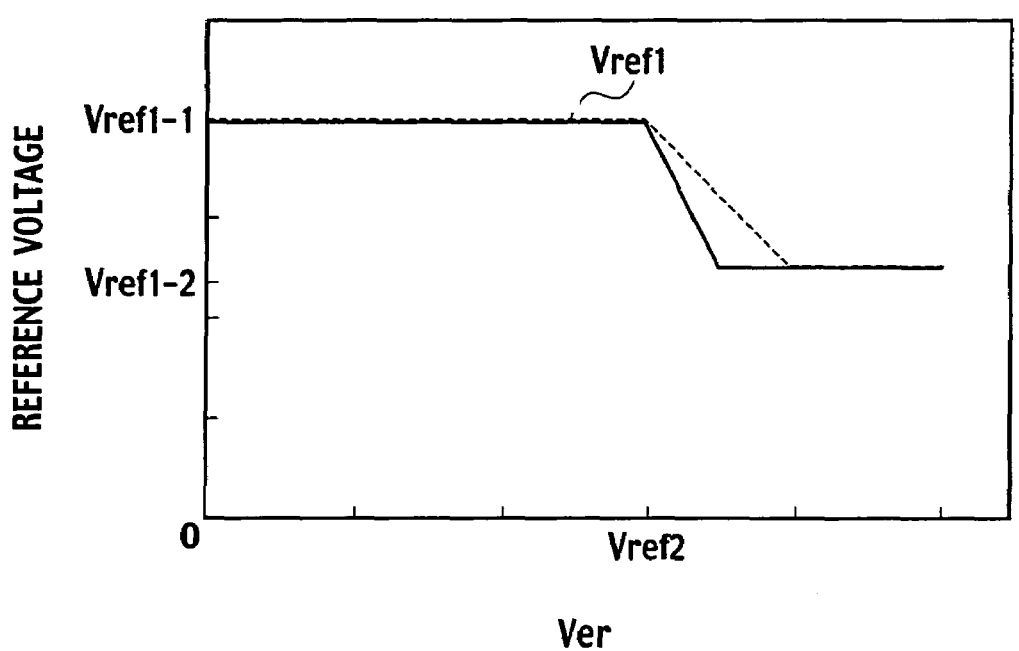

SWITCHING POWER SOURCE APPARATUS

BACKGROUND OF THE INVENTION

1. Field of the Invention

The present invention relates to a switching power source used for, for example, electronic equipment, and particularly, to a switching power source having a power-factor improving function to improve conversion efficiency.

2. Description of the Related Art

A switching power source apparatus having a power-factor improving converter is used for electronic equipment such as AC adaptors, OA equipment, and consumer equipment, and therefore, must be in compliance with harmonic current regulations (IEC/EN6 1000-3-2) and harmonic suppression guidelines for household and general-purpose appliances. There is a requirement in recent years for a high-efficiency switching power source apparatus capable of contributing to the downsizing and energy-saving of electronic equipment.

FIG. 1 shows an example of a step-up chopper conforming to the harmonic current regulations and serving as a switching power source apparatus. In FIG. 1, a power-factor improving converter consists of a rectifier 2 employing a diode bridge, a switching element 4 turned on and off by a controller 8, and a step-up reactor 3. This step-up chopper controls an ON/OFF switching operation of the switching element 4 so that a peak current of the step-up reactor 3 may follow an input voltage and provide a constant output voltage conforming to the harmonic current regulations.

SUMMARY OF THE INVENTION

To improve a power factor, the above-mentioned step-up chopper conducts a step-up operation such that an output voltage of the step-up chopper keeps the following relationship with respect to the maximum value (multiplied by $\sqrt{2}$) of an input AC voltage:

$$\text{(output voltage Vout)} \geq \text{(AC input voltage Vin)} \times \sqrt{2} \quad (1)$$

Namely, the output voltage must be increased if the input AC voltage Vin is increased.

If the input AC voltage is in the range of 90 Vac to 265 Vac, the output voltage of the step-up chopper must be "maximum AC input voltage$\times\sqrt{2}$" such as 370 Vdc to 400 Vdc to properly conduct a power-factor improving operation even if the input AC voltage reaches the maximum value.

If the input AC voltage is low, for example, 90 Vac, the step-up chopper must increase this voltage to 370 Vdc to 400 Vdc due to the power-factor improving operation. This involves a large step-up ratio. As the step-up ratio increases, the switching element of the step-up chopper causes a larger loss to decrease the power conversion ratio of the step-up chopper.

It is strongly required, therefore, to realize a circuit capable of conducting constant-voltage control on a low-voltage-range AC power source of, for example, a 100-volt-based input voltage Vin, to provide an optional constant output voltage Vout in the range of 230 Vdc to 250 Vdc.

The present invention provides a switching power source apparatus capable of improving conversion efficiency without increasing a power-factor improving step-up ratio.

According to a first technical aspect of the present invention, there is provided a switching power source apparatus for ON/OFF-controlling an input AC voltage with a switching element and converting the input AC voltage into a DC voltage that is higher than the AC voltage and is supplied as an output voltage. The switching power source apparatus includes an error amplifier configured to provide an error voltage representative of a difference between the output voltage and a first reference voltage, a controller configured to control the switching element according to the error voltage, the controller turning off the switching element when a predetermined ON time is reached, and a variable reference voltage generator configured to generate the first reference voltage according to the error voltage.

According to a second technical aspect of the present invention, the variable reference voltage generator includes an error voltage comparator configured to compare the error voltage with a second reference voltage, and if the error voltage is greater than the second reference voltage, provide a switching signal, and a reference voltage switch configured to switch the first reference voltage to a lower reference voltage in response to the switching signal and provide the error amplifier with the lower reference voltage.

According to a third technical aspect of the present invention, the variable reference voltage generator includes a voltage/impedance converter configured to change an impedance according to the error voltage and a voltage generator configured to generate the first reference voltage, which decreases as the error voltage increases, according to the impedance provided by the voltage/impedance converter.

BRIEF DESCRIPTION OF THE DRAWINGS

FIG. 10 is a view showing a continuous change in a first reference voltage relative to an error voltage.

DESCRIPTION OF THE PREFERRED EMBODIMENT

Embodiments of the present invention will be explained with reference to the drawings.

First Embodiment

Figure 1:
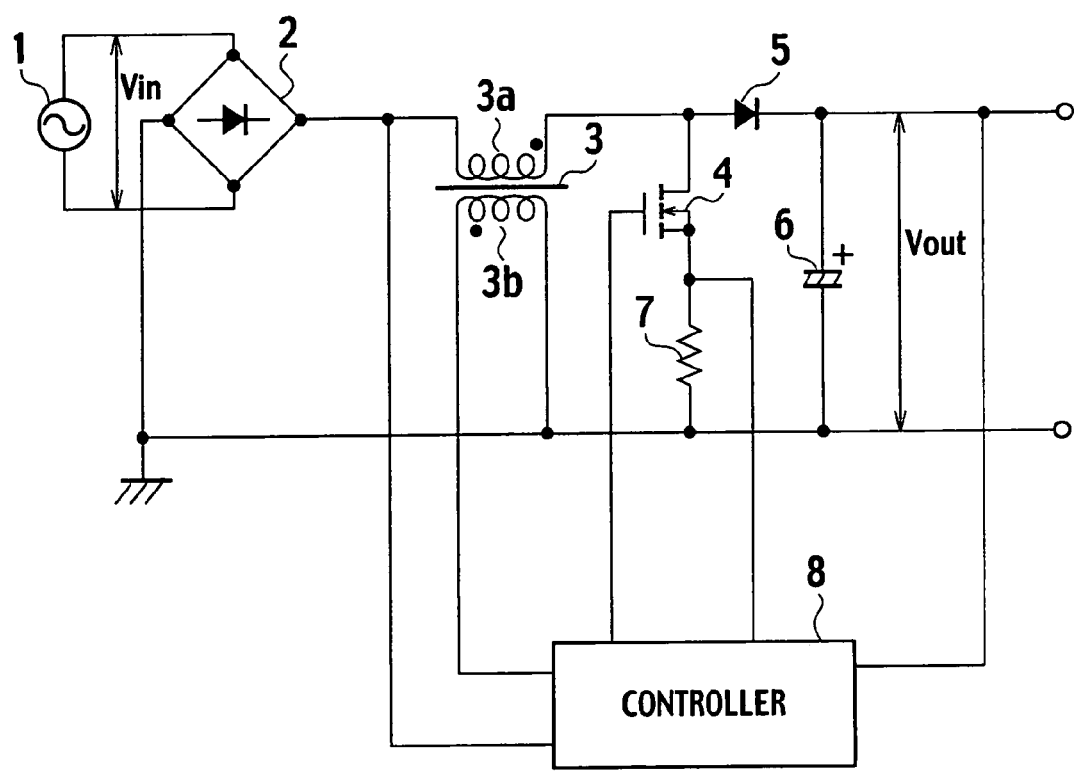
FIG. 1 is a view showing a switching power source apparatus according to a related art.
Figure 2:
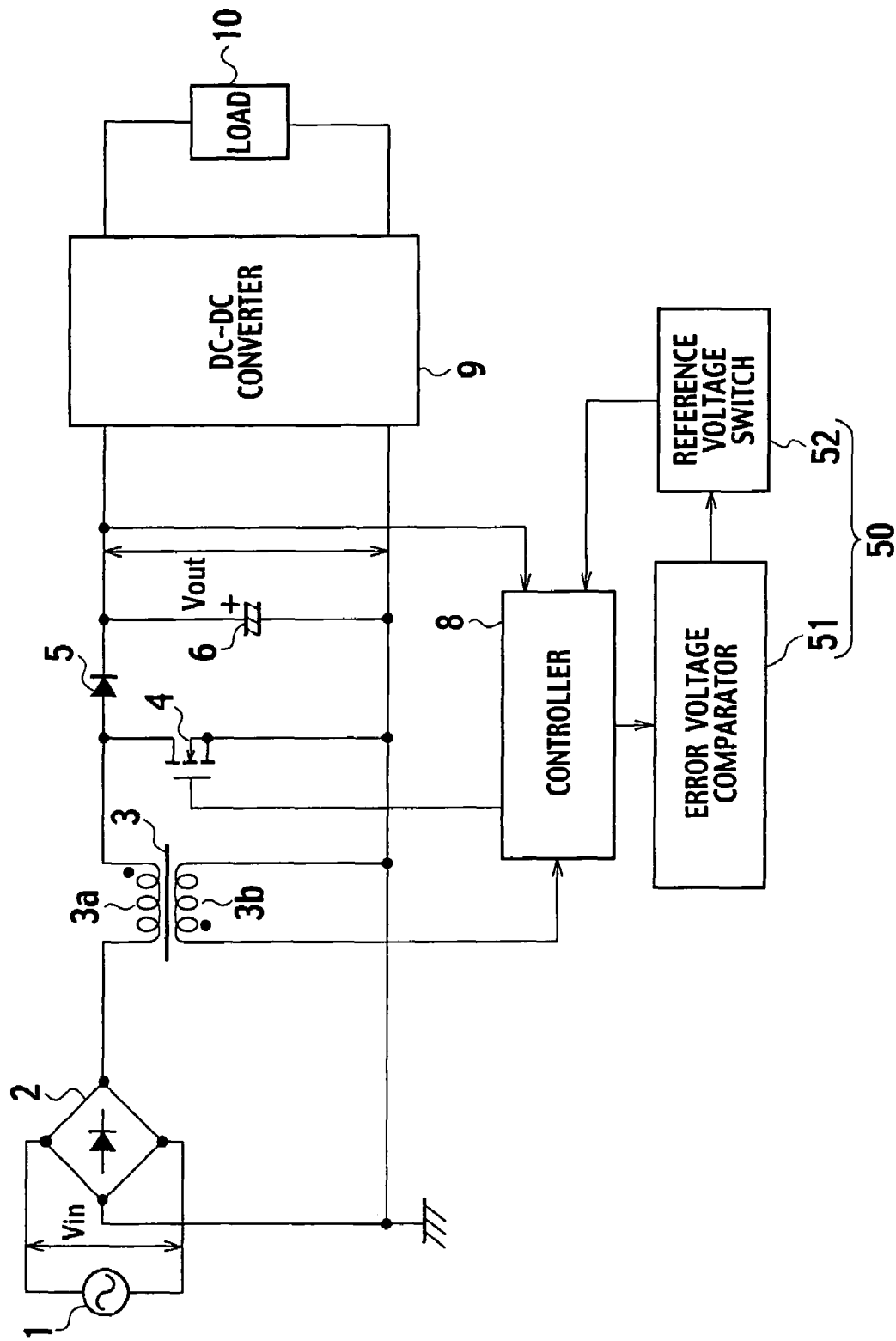
FIG. 2 is a view showing a power-factor improving circuit applicable to a switching power source apparatus according to a first embodiment of the present invention.

FIG. 2 is a view showing a power-factor improving circuit applicable to a switching power source apparatus according to the first embodiment of the present invention. With reference to FIG. 2, the power-factor improving circuit will be explained.

The power-factor improving circuit includes a rectifier 2 employing a diode bridge, a step-up reactor 3, a switching element 4, an output diode 5, a smoothing capacitor 6, a controller 8, and a variable reference voltage generator 50. The variable reference voltage generator 50 includes an error voltage comparator 51 and a reference voltage switch 52. The power-factor improving circuit is connected to a DC-DC converter 9 that supplies a DC voltage to a load 10.

In FIG. 2, an AC power source 1 supplies a sinusoidal voltage to the rectifier 2, which full-wave-rectifies the sinusoidal voltage and supplies the rectified voltage to the step-up reactor 3 and controller 8.

The step-up reactor 3 has a primary winding 3a and a criticality detection winding 3b. An end of the primary winding 3a is connected to an output terminal of the rectifier 2, and the other end thereof is connected to a drain of the switching element 4 and an anode of the output diode 5. An end of the criticality detection winding 3b is connected to the controller 8, and the other end thereof is connected to a ground GND. A cathode of the output diode 5 is connected to an end of the smoothing capacitor 6, an input terminal of the DC-DC converter 9, and the controller 8.

A gate of the switching element 4 is connected so as to receive a drive signal from the controller 8. A source of the switching element 4 is connected to the ground GND.

The power-factor improving circuit provides a DC output Vout to the DC-DC converter 9. The DC-DC converter 9 is, for example a flyback converter to convert the DC voltage provided by the power-factor improving circuit into another DC voltage, which is applied to the load 10.

The controller 8 has an error amplifier. The error amplifier provides an error voltage comparator 51 with an error voltage representative of a difference between the output voltage from the power-factor improving circuit to the DC-DC converter 9 and a first reference voltage. The error voltage comparator 51 compares the error voltage provided by the error amplifier of the controller 8 with a second reference voltage, and if the error voltage is greater than the second reference voltage, supplies a switching signal to the reference voltage switch 52. In response to the switching signal from the error voltage comparator 51, the reference voltage switch 52 switches the first reference voltage to a lower value and supplies the same to the controller 8.

Figure 3:
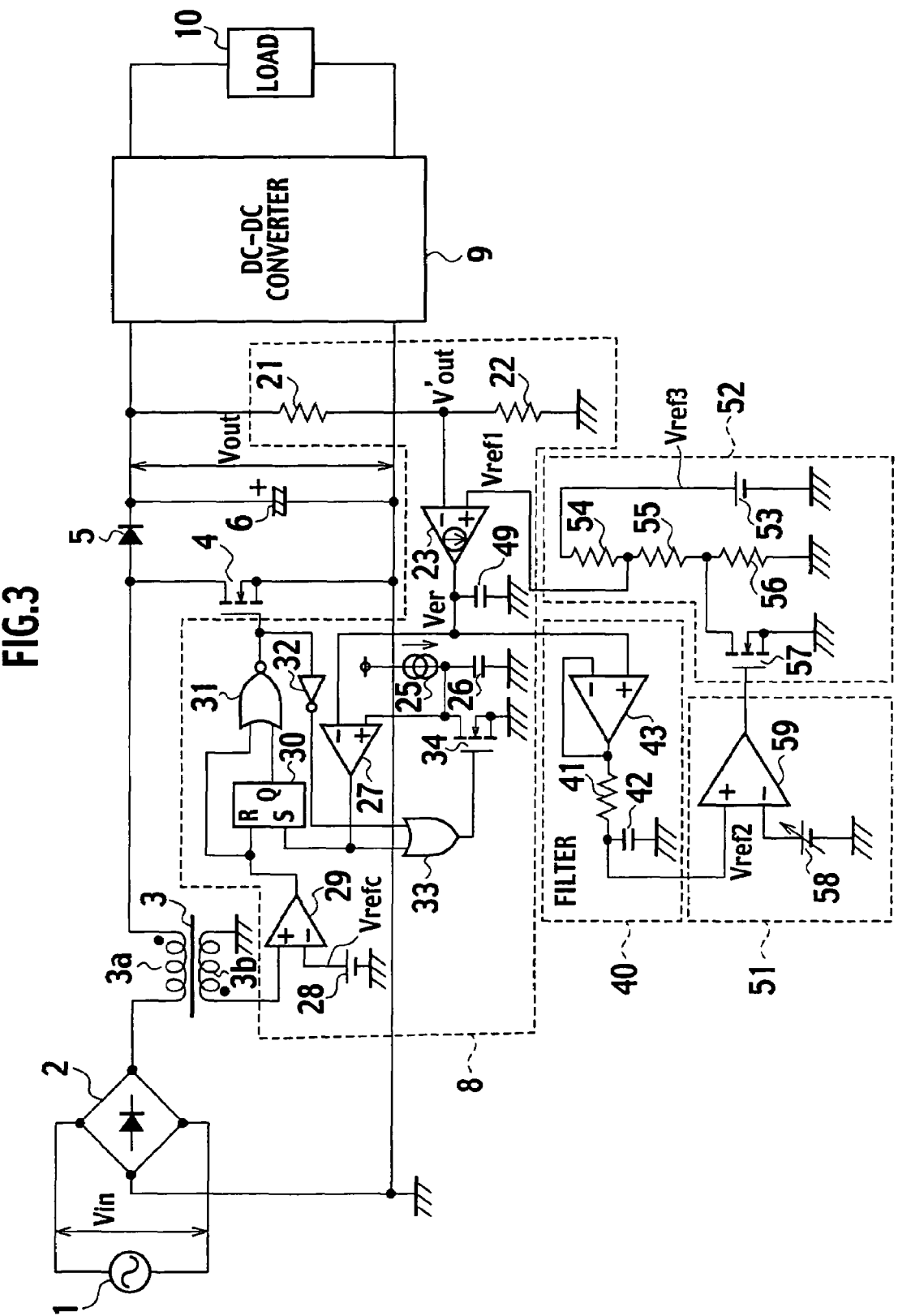
FIG. 3 is a view showing the details of the power-factor improving circuit of FIG. 2.

FIG. 3 is a view showing the details of the power-factor improving circuit applicable to the switching power source apparatus according to the first embodiment of the present invention. With reference to FIG. 3, the power-factor improving circuit will be explained.

In the controller 8, a non-inverting input terminal "+" of a comparator 29 receives a voltage generated by the criticality detection winding 3b. If this voltage is lower than a reference voltage 28 (Vrefc), the comparator 29 provides a low-level signal to a reset terminal of an RS flip-flop 30 and an input terminal of a NOR circuit 31. Then, the NOR circuit 31 provides a high-level signal to the switching element 4 to turn on the switching element 4.

Elements incorporated in the controller 8 will be explained. A conductance amplifier (error amplifier) 23 generates an error voltage Ver representing a difference between a voltage obtained by dividing the output voltage Vout by resistors 21 and 22 and a reference voltage Vref1 provided by the reference voltage switch 52. A constant current source 25 supplies a charge current to a capacitor 26. A comparator 27 compares a terminal voltage of the capacitor 26, which increases according to the charge voltage supplied by the constant current source 25, with the error voltage Ver and determines an ON-time. An OR circuit 33 turns on a switch 34 according to an output signal from the comparator 27, to reset the terminal voltage of the capacitor 26. These elements function as an ON-time determination circuit to determine an ON-time of the switching element 4. When the determined ON-time is reached, the comparator 27 provides a set signal to the RS flip-flop 30 to set a Q-output terminal of the RS flip-flop 30 to a high level. Then, the NOR circuit 31 provides a low-level signal to the switching element 4 to turn off the switching element 4. This control stabilizes the output voltage Vout.

A filter 40 includes a resistor 41, a capacitor 42, and an operational amplifier 43. The resistor 41 and capacitor 42 are connected to an output terminal of the operational amplifier 43. The resistor 41 and capacitor 42 are set to provide a time constant corresponding to a frequency lower than a switching frequency of ON/OFF control of the switching element 4. The operational amplifier 43 involves a voltage follower connection. The error voltage Ver from the comparator 23 of the controller 8 is noise-reduced with a capacitor 49 and is supplied to a non-inverting input terminal (+) of the operational amplifier 43. The operational amplifier 43 provides an impedance-reduced error voltage Ver, which is delayed by the resistor 41 and capacitor 42 and is supplied to a comparator 59.

The comparator 59 is in the error voltage comparator 51. The delayed error voltage Ver from the filter 40 is supplied to a non-inverting input terminal "+" of the comparator 59, and a reference voltage Vref2 from a variable reference voltage 58 is supplied to an inverting input terminal (−) of the comparator 59. The comparator 59 compares these voltages with each other, and if the error voltage Ver is greater than the reference voltage Vref2, provides a high-level switching signal to the reference voltage switch 52.

The reference voltage switch 52 includes a reference voltage source 53 for generating a reference voltage Vref3 and a potentiometer (54 to 57) being connected to the reference voltage source 53. The potentiometer provides an output voltage serving as the reference voltage Vref1. The potentiometer consists of resistance elements including a variable resistance element. The variable resistance element has a resistance value corresponding to a control signal provided by the error voltage comparator 51. According to this embodiment, the potentiometer is composed of resistance elements 54 to 56. The resistance element 56 and a switching element 57, which is connected in parallel to both ends of the resistance element 56, form the variable resistance element. The resistance element 56 whose one end is grounded is selectively bypassed under the control of the switching element 57, to change the output voltage Vref1 of the potentiometer accordingly.

The switching element 57, i.e., a transistor (FET) 57 is turned on in response to a high-level switching signal from the error voltage comparator 51. If a low-level signal is supplied to a gate terminal of the FET 57, the FET 57 is OFF. In this case, the reference voltage 53 is divided by the resistors 54, 55, and 56 to provide a reference voltage Vref1-1, which is provided as the reference voltage Vref1 to the non-inverting input terminal (+) of the comparator 23. When a high-level switching signal is applied to the gate terminal of the FET 57, the FET 57 is ON so that a drain of the FET 57 is connected to a source of the FET 57. In this case, the reference voltage 53 is divided by the resistors 54 and 55 to provide a reference voltage Vref1-2, which is provided as the reference voltage Vref1 to the non-inverting input terminal (+) of the comparator 23. In this way, the potentiometer of this embodiment can select one of the two voltage divided values made from the reference voltage Vref3 and can output the selected one as the reference voltage Vref1. The variable resistance element may be set at any one of the resistance elements of the potentiometer.

The reference voltages Vref1-1 and Vref1-2 have the following relationship:

$$Vref_{1-1} > Vref_{1-2} \quad (2)$$

With reference to a timing chart of FIG. 4 and graphs of FIGS. 5 to 8, operation of the switching power source apparatus according to the first embodiment of the present invention will be explained. The AC power source 1 applies power to the power-factor improving circuit. Namely, the AC power source 1 supplies a sinusoidal voltage to the rectifier 2, which full-wave-rectifies the supplied voltage and provides a full-wave-rectified waveform to the power-factor improving circuit.

(1) Initial Operation

At first, the non-inverting input terminal (+) of the comparator 29 is connected to the ground GND through the criticality detection winding 3b, and the inverting input terminal (−) of the comparator 29 receives the reference voltage Vrefc. The comparator 29 compares the input voltages with each other. Since the voltage at the non-inverting input terminal is lower than the other, the comparator 29 provides a low-level signal to the RS flip-flop 30.

The RS flip-flop 30 is reset in response to the reset signal from the comparator 29. At timing t1 of FIG. 4, the NOR circuit 31 provides a high-level drive signal to turn on the switching element 4.

Figure 4:
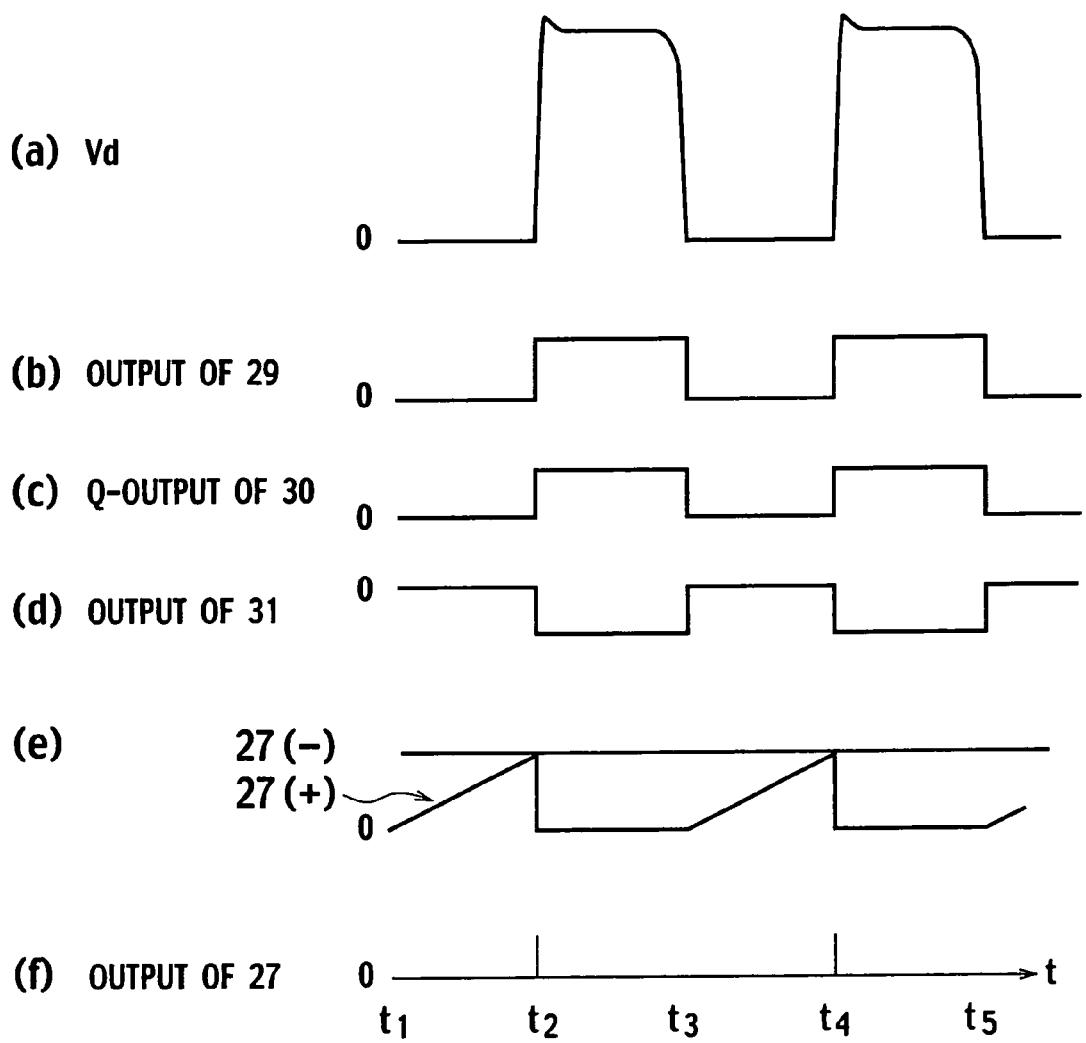
FIGS. 4(a) to 4(f) are timing charts explaining operation of the switching power source apparatus according to the first embodiment of the present invention.

When the switching element 4 is turned on, a drain voltage Vd of the switching element 4 drops close to 0 V at the timing t1 of FIG. 4. The rectifier 2 passes a switching current to the primary winding 3a, to the drain and source of the switching element 4, and to the ground GND. As a result, the step-up reactor 3 accumulates energy.

(2) Operation of ON-Time Determination Circuit

At this time, in the ON-time determination circuit for determining an ON-time of the switching element 4, the constant current source 25 supplies a constant charge current to the capacitor 26. A terminal voltage of the capacitor 26 gradually increases in proportion to time, to increase a voltage at the non-inverting input terminal of the comparator 27.

The comparator 27 compares this voltage with an error voltage Ver supplied to the inverting input terminal thereof. If the terminal voltage of the capacitor 26 is greater than the error voltage Ver, the comparator 27 provides, at timing t2 of FIG. 4, a high-level pulse signal as an ON-time determination signal to a set terminal of the RS flip-flop 30 to set the RS flip-flop 30, as well as to the switch 34 through the OR circuit 33 to turn on the switch 34. As a result, the capacitor 26 discharges and is reset until the switching element 4 is turned on next time.

At this time, the Q-output of the RS flip-flop 30 is set to a high level. At the timing t2 of FIG. 4, the output of the NOR circuit 31 provides a low-level drive signal to turn off the switching element 4 to stabilize the output voltage Vout.

(3) Input Current Waveform

The response characteristic of the error amplifier 23 is sufficiently slow compared with a switching frequency, and therefore, the error voltage Ver connected to the inverting input terminal of the comparator 27 of the ON-time determination circuit determining an ON-time of the switching element 4 changes very slowly compared with a change in the terminal voltage of the capacitor 26 being connected to the non-inverting input terminal "+" of the comparator 27.

Accordingly, it can be considered that an output signal from the ON-time determination circuit conducts switching control with a fixed ON-time and a variable OFF-time in terms of one cycle of the frequency of the AC power source 1.

When a voltage is applied to the step-up reactor 3, a current to the step-up reactor 3 is determined by an energization time and the applied voltage. If control is conducted with a fixed ON-time and a variable OFF-time, a peak value of the AC power source 1 determines a current to the step-up reactor 3. Accordingly, the current to the step-up reactor 3 has a waveform similar to a voltage waveform of the AC power source 1.

Figure 5:
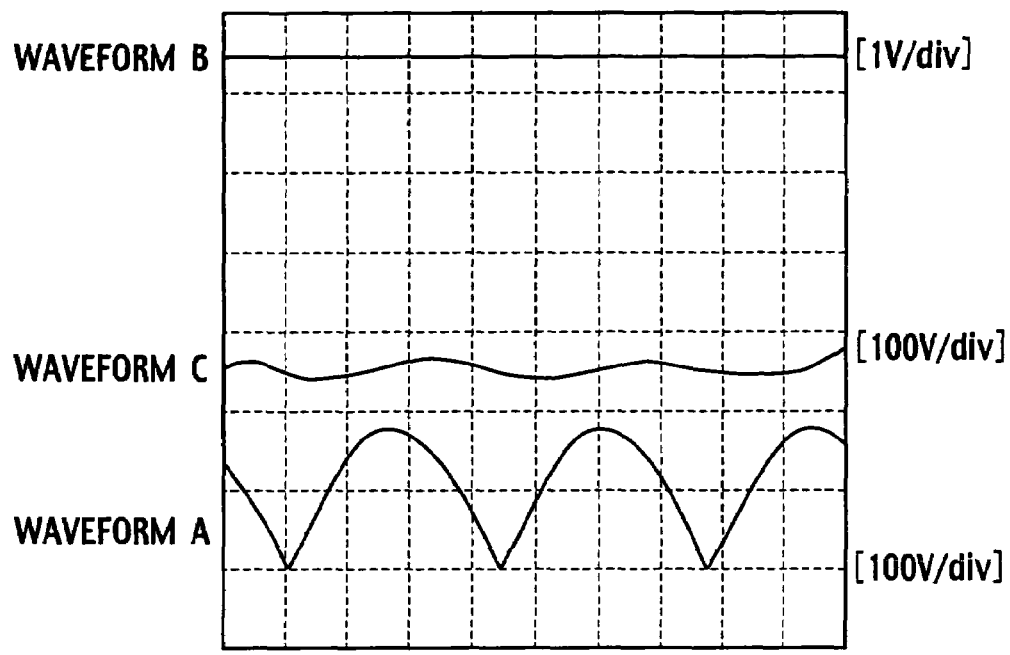
FIG. 5 shows waveforms of parts of the switching power source apparatus according to the first embodiment of the present invention.

A waveform A shown in FIG. 5 is a full-wave-rectified voltage waveform provided by the rectifier 2, a waveform B is of the error voltage Ver provided by the conductance amplifier 23, and a waveform C is of the output voltage Vout provided by the output capacitor 6.

At the timing t2 of FIG. 4, the switching element 4 turns off. Then, the energy accumulated in the step-up reactor 3 and the voltage supplied by the rectifier 2 are combined to charge the output capacitor 6 through the rectifying diode 5. As a result, as shown in the waveform C of FIG. 5, the output capacitor 6 receives a voltage that is higher than a peak value of the full-wave-rectified waveform supplied by the rectifier 2.

(4) ON-Control of Switching Element

When the discharge of the energy accumulated in the step-up reactor 3 is finished, the criticality detection winding 3b generates counter electromotive force to invert the voltage of the criticality detection winding 3b. This voltage is compared with the reference voltage (Vrefc) 28 by the comparator 29, and at timing t3, the comparator 29 provides a low-level signal to the RS flip-flop 30 and NOR circuit 31.

In response to the signal from the comparator 29 and the Q-output of the RS flip-flop 30, the NOR circuit 31 provides a high-level output. As a result, at the timing t3 of FIG. 4, a drive signal is again supplied to the switching element 4 to turn on the switching element 4.

The operations mentioned above are repeated thereafter, to maintain a constant output voltage at the output capacitor 6 of the power-factor improving circuit. At the same time, a current from the AC power source 1 shows a sinusoidal current waveform similar to the voltage waveform of the AC power source 1.

(5) Operation of Conductance Amplifier

When the drive signal to the gate terminal of the switching element 4 changes to a low level to turn off the switching element 4, the terminal voltage of the capacitor 26 connected to the non-inverting input terminal of the comparator 27 increases. Namely, the terminal voltage of the capacitor 26 exceeds the error voltage Ver supplied to the inverting input terminal of the comparator 27. The level of the error voltage Ver is adjusted according to the state of the output voltage Vout.

Such level adjustment is carried out by the conductance amplifier (error amplifier) 23. The conductance amplifier 23 receives a divided value of the output voltage Vout of the output capacitor 6 divided by the resistors 21 and 22 and compares it with the reference voltage Vref1. If the resistor-divided value of the output voltage Vout is greater than the reference voltage Vref1, the conductance amplifier 23 provides a lower error voltage Ver, and if the resistor-divided value of the output voltage Vout is smaller than the reference voltage Vref1, a higher error voltage Ver.

More precisely, if the resistor-divided value of the output voltage Vout of the output capacitor 6 is greater than the reference voltage Vref1, the error voltage Ver from the conductance amplifier 23 becomes smaller so that, in the ON-time determination circuit, a time of the terminal voltage of the capacitor 26 connected to the positive input terminal "+" of the comparator 27 to reach the error voltage Ver connected to the negative input terminal (−) of the comparator 27 becomes shorter.

If the terminal voltage of the capacitor 26 exceeds the error voltage Ver, the comparator 27 provides a high-level pulse signal as an ON-time determination signal to the set terminal of the RS flip-flop 30. As a result, the switching element 4 is quickly turned off to shorten an ON-time and decrease the output voltage Vout.

If the charge voltage of the capacitor 26 to which a constant current is supplied exceeds the error voltage Ver, the ON-time determination circuit provides an ON-time determination signal to the RS flip-flop 30 and discharges the capacitor 26 until the switching element 4 is turned on. Namely, the ON-time of the switching element 4 can be determined according to the magnitude of the error voltage Ver.

(6) Reference Voltage Vref1 Provided by Reference Voltage Switch 52

Figure 6:
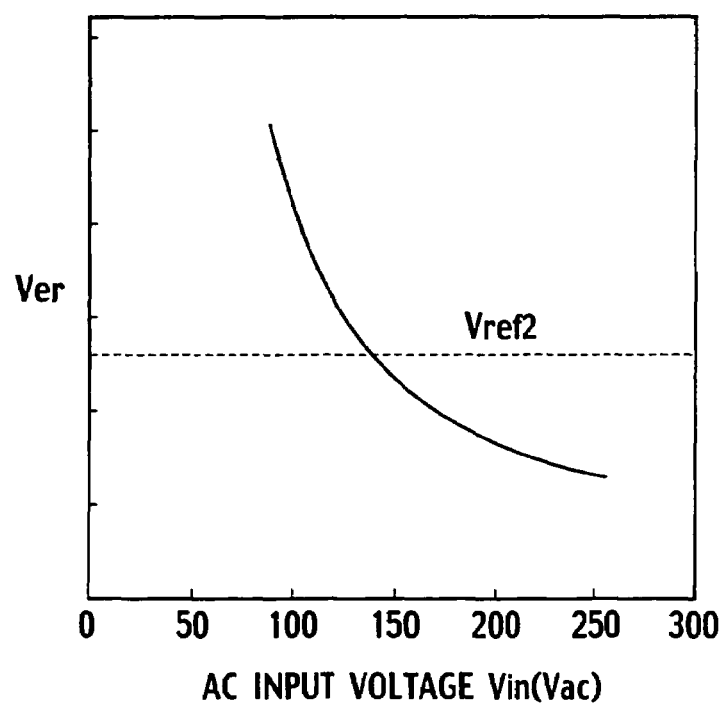
FIG. 6 is a graph showing dependence between an error voltage Ver and an input AC power source voltage under a rated load.

If the AC voltage Vin continuously increases from, for example, 90 V to 250 V under rated power, the error voltage Ver provided by the conductance amplifier 23 follows a downward curve shown in FIG. 6.

Figure 7:
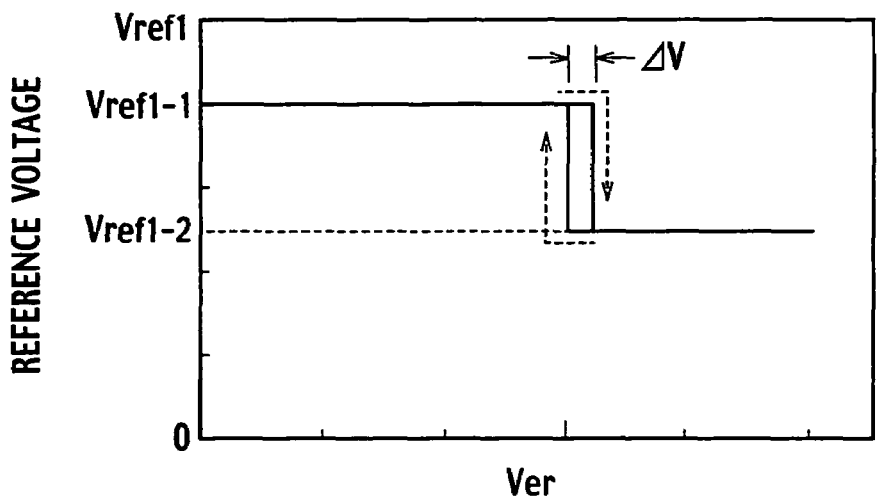
FIG. 7 is a graph showing a relationship between an error voltage Ver and a first reference voltage.

The reference voltage Vref1 supplied to the non-inverting input terminal "+" of the conductance amplifier 23 is a variable reference voltage that varies according to the error voltage Ver provided by the conductance amplifier 23. Namely, the error voltage Ver provided by the conductance amplifier 23 is supplied through the filter 40 to the non-inverting input terminal of the error voltage comparator 59. If the error voltage Ver is above the reference voltage Vref2, the comparator 59 provides a high-level switching signal to put the FET 57 of the reference voltage switch 52 in a conductive state. As a result, the reference voltage Vref1 is switched from Vref1-1 to Vref1-2 as shown in FIG. 7.

Figure 8:
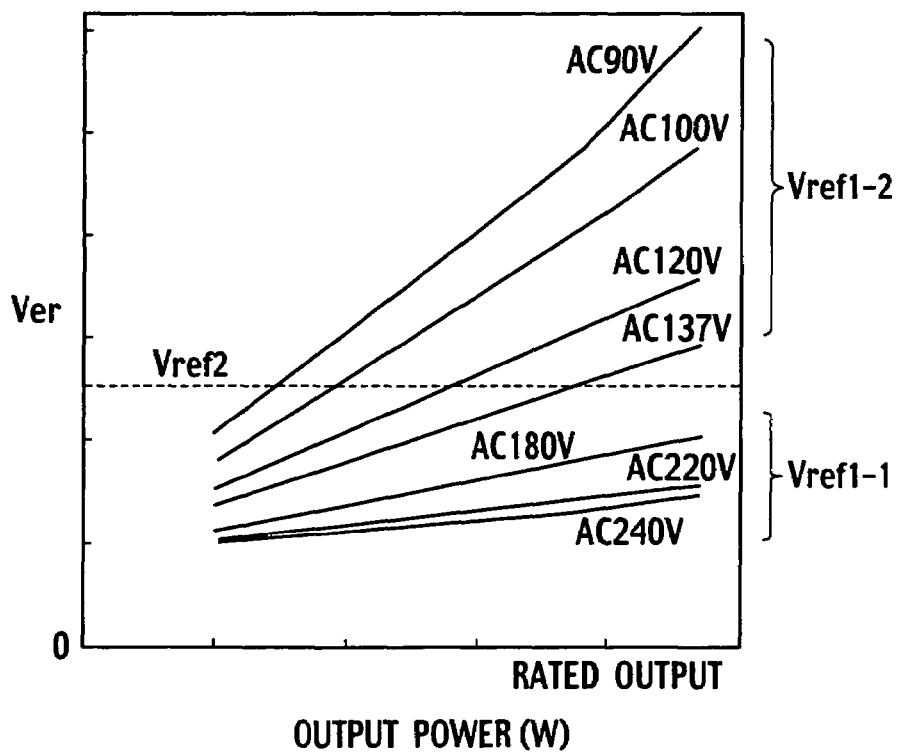
FIG. 8 is a graph showing a relationship between output power and the first reference voltage.

Namely, if the error voltage Ver provided by the conductance amplifier 23 is greater than the reference voltage Vref2, the reference voltage switch 52 supplies the reference voltage Vref1-2 to the non-inverting input terminal of the conductance amplifier 23 so that even a 100-volt-based AC power source Vin can be stepped up to provide an output voltage Vout in the range of 230 Vdc to 250 Vdc as shown in FIG. 8.

If the AC power source Vin is in a low range, e.g., a 100-volt-based range, the conductance amplifier 23 is operated with the reference voltage Vref1-2, so that the output voltage Vout may keep an optional constant value within the range of 230 Vdc to 250 Vdc. This results in improving conversion efficiency without increasing the step-up ratio of the power-factor improving circuit.

If the error voltage Ver provided by the conductance amplifier 23 is below the reference voltage Vref2, the reference voltage switch 52 supplies the reference voltage Vref1-1 to the conductance amplifier 23 so that even a 200-volt-based AC power source Vin can be stepped up to provide a constant output voltage in the range of 370 Vdc to 400 Vdc as shown in FIG. 8.

If the AC power source Vin is in a high range, e.g., a 200-volt-based range, the conductance amplifier 23 is operated with the reference voltage Vref1-1, so that the output voltage Vout may keep an optional constant value within the range of 370 Vdc to 400 Vdc. As a result, the power-factor improving circuit can conduct a step-up operation to improve a power factor.

The switching AC power source voltage may be within the range of 140 Vac to 170 Vac other than the 100-volt-based low range or the 200-volt-based high range. In this case, even when the AC input power source Vin reaches a maximum value, the embodiment can step up the same to provide a proper output voltage Vout while improving a power factor and power source quality.

As shown in FIG. 7, the error voltage comparator 51 may be designed to have a hysteresis characteristic between an ascending curve and a descending curve of the error voltage Ver. More precisely, a feedback resistor 49 (not shown) may be connected between the positive input terminal "+" and the output terminal of the comparator 59, so that the reference voltage is switched from Vref1-2 to Vref1-1 when the error voltage Ver decreases below the reference voltage Vref2, and from Vref1-1 to Vref1-2 when the error voltage Ver increases above the reference voltage Vref2+ΔV. This may prevent a malfunction due to noise and the like.

The filter 40 arranged between the controller 8 and the error voltage comparator 51 delays the error voltage Ver provided by the controller 8, to stabilize the constant voltage control.

(7) Characteristic Operation of this Embodiment

According to this embodiment, the error voltage Ver provided by the conductance amplifier 23 increases as the load increases, to drop the output voltage Vout. If the error voltage Ver exceeds the reference voltage Vref2, the comparator 59 provides a high-level switching signal to the FET 57 to turn on the FET 57. As a result, the resistor 56 is bypassed, and the reference voltage Vref1 supplied to the conductance amplifier 23 is decreased from Vref1-1 to Vref1-2.

When the reference voltage Vref1 is decreased, the error voltage Ver provided by the conductance amplifier 23 substantially becomes invariable. As a result, the comparator 27 quickly provides a set signal to quickly turn off the switching element 4. This results in decreasing the output voltage Vout. The constant voltage control is applicable to, for example, a 100-volt-based, low-voltage-range AC power source Vin, so that the output voltage Vout may be set to an optional constant voltage in the range of, for example, 230 Vdc to 250 Vdc. In this way, it is possible to improve conversion efficiency without increasing the step-up ratio of the power-factor improving circuit.

Second Embodiment

Figure 9:
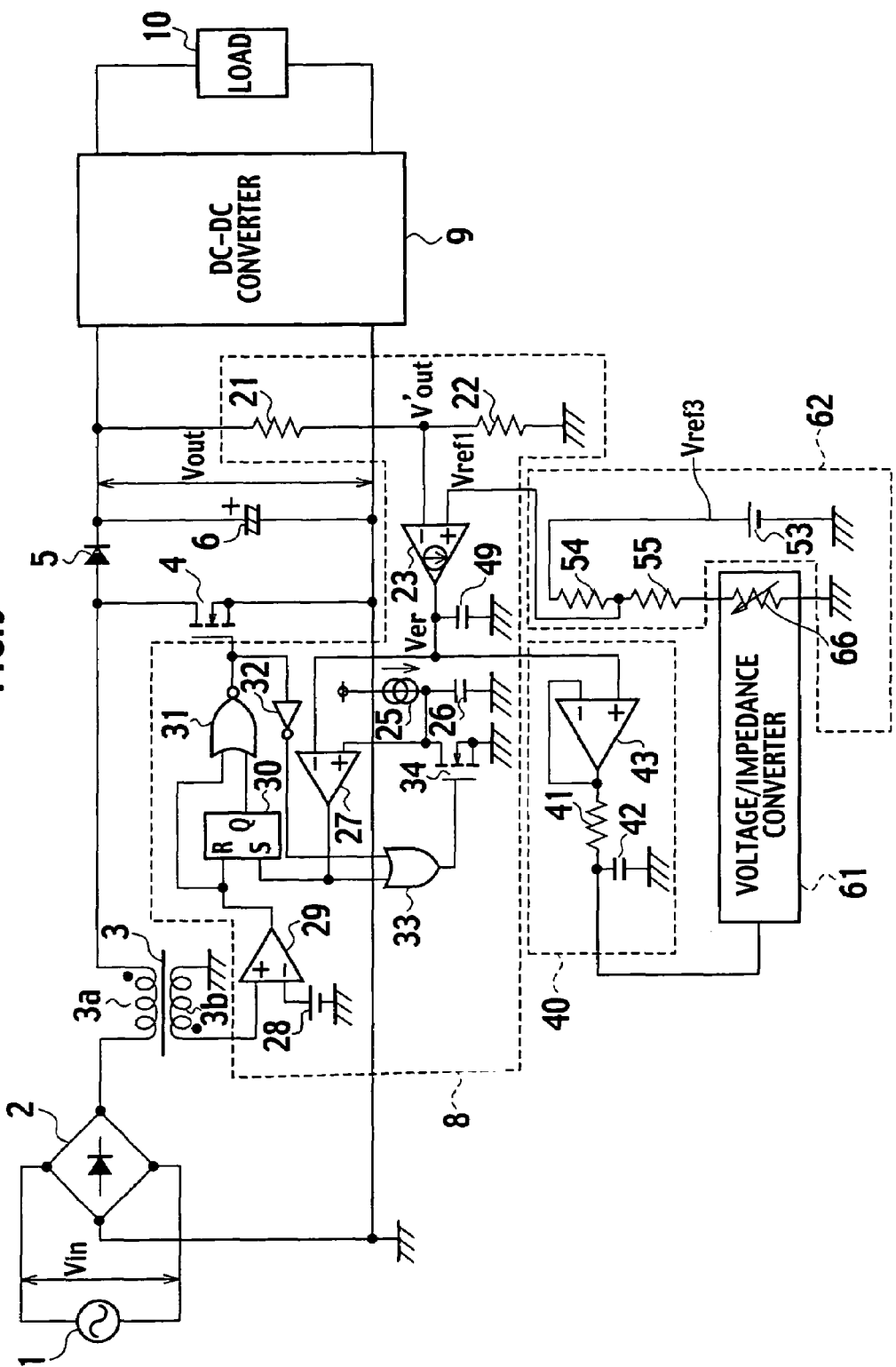
FIG. 9 is a view showing a power-factor improving circuit applicable to a switching power source apparatus according to a second embodiment of the present invention.

FIG. 9 is a view showing a power-factor improving circuit applicable to a switching power source apparatus according to the second embodiment of the present invention. With reference to FIG. 9, the power-factor improving circuit will be explained. In the following explanation, the same parts as those of the first embodiment of FIG. 3 are represented with the same reference marks and their explanations are omitted.

The second embodiment employs a variable reference voltage generator 50 including a voltage/impedance converter 61 and a reference voltage generator 62.

The voltage/impedance converter 61 receives an error voltage Ver from a filter 40, converts it into an impedance according to the level of the error voltage Ver, and provides a resistance value corresponding to the voltage level.

The voltage/impedance converter 61 includes a variable impedance 66 serving as a variable resistance element. Like the first embodiment, resistance elements 54 and 55 and the variable impedance 66 form a potentiometer.

Namely, in the reference voltage generator 62, a resistance value provided by the voltage/impedance converter 61 is connected to the resistor 55, to thereby form a variable composite resistor. The composite resistor and the resistor 54 divide a reference voltage Vref3 (53). The divided voltage is supplied as a reference voltage Vref1 to a conductance amplifier 23.

With reference to a graph of FIG. 10, a characteristic operation of the switching power source apparatus according to the second embodiment of the present invention will be explained. The filter 40 provides an error voltage Ver to the voltage/impedance converter 61. According to the level of the error voltage Ver, the voltage/impedance converter 61 converts the error voltage Ver into a resistance value corresponding to the voltage level. The resistance value is supplied to the reference voltage generator 62. In the reference voltage generator 62, the resistance value is connected to the resistor 55 in series, to form a variable composite resistor. The composite resistor and resistor 54 divide the reference voltage 53, and the divided voltage is supplied as a reference voltage Vref1 to the conductance amplifier 23. If the error voltage Ver exceeds a reference voltage Vref2, the reference voltage Vref1 given to the conductance amplifier 23 gradually continuously decreases from Vref1-1 to Vref1-2 according to the magnitude of the error voltage Ver.

Namely, the voltage/impedance converter 61 generates a resistance value that decreases as the error voltage Ver increases, and the reference voltage generator 62 generates the first reference voltage Vref1 that decreases as the resistance value provided by the voltage/impedance converter 61 decreases. Consequently, the first reference voltage Vref1 that decreases as the error voltage Ver increases is used to conduct constant voltage control to decrease an output voltage Vout.

When the reference voltage Vref1 to the conductance amplifier 23 gradually decreases, the error voltage Ver provided by the conductance amplifier 23 becomes substantially invariable to gradually decrease the output voltage Vout. The constant voltage control is applicable to, for example, a 100-volt-based, low-voltage-range AC power source Vin, so that the output voltage Vout may be set to an optional constant voltage in the range of, for example, 230 Vdc to 250 Vdc. In this way, the second embodiment can improve conversion efficiency without increasing the step-up ratio of the power-factor improving circuit.

Between a controller 8 and the voltage/impedance converter 61, a filter 40 may be arranged to delay the error voltage Ver generated by the controller 8. This results in stabilizing the constant voltage control.

The first and second embodiments have been explained in connection with a critical current operation in which a reactor current is about 0 A. The present invention is not limited to such a case. The present invention is also applicable to a discontinuous operation in which a reactor current is discontinuous and to a continuous operation in which a reactor current is continuous.

The first and second embodiments have employed a flyback converter as the DC-DC converter 9. The present invention is not limited to such a case. The present invention is also applicable to an RCC circuit, a forward converter circuit, a half-bridge circuit, a bridge circuit, and the like.

Effect of Invention

The present invention sets a first reference voltage according to an error voltage, to conduct constant voltage control on a low output voltage to improve conversion efficiency and power factor without increasing a step-up ratio.

The present invention has no need of inputting an input voltage waveform into a controller to make an input current waveform similar to the input voltage waveform. This eliminates the need of a multiplier for forming a current target value, thereby simplifying a circuit structure and reducing the number of connection terminals. Under heavy load, the present invention can decrease an output voltage for a low-voltage-range (100-volt-based) AC power source and can switch to a high output voltage for a high-voltage-range (200-volt-based) AC power source. The present invention, therefore, can reduce the loss of a switching element and can improve a power conversion ratio even with a low-voltage-range AC power source. In addition, the present invention can carry out a power-factor improving operation with any of the low- and high-voltage-range AC power sources.

When the first reference voltage is changed to another reference voltage, a power source voltage substantially corresponds to an AC voltage between the low and high ranges, and therefore, the present invention can stably conduct constant voltage control and improve a power source quality for any of the 100- and 200-volt-based AC power sources. In addition, the present invention can conduct a power-factor improving operation at or around the power source voltage at which the first reference voltage is changed to the other reference voltage.

The present invention controls the first reference voltage with the use of an error voltage, to prevent a malfunction due to noise. The present invention needs no multiplier nor input voltage waveform to be input into a controller to make an input current waveform similar to an input voltage waveform. Accordingly, the present invention involves no increase in the number of pins nor a package change when forming ICs. This results in suppressing costs and package size.

This application claims benefit of priority under 35USC §119 to Japanese Patent Applications No. 2004-100756, filed on Mar. 30, 2004, the entire contents of which are incorporated by reference herein. Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A switching power source apparatus for ON/OFF-controlling an input AC voltage with a switching element and converting the input AC voltage into a DC voltage that is higher than the AC voltage and is supplied as an output voltage, comprising:

an error amplifier configured to provide an error voltage representative of a difference between the output voltage and a first reference voltage;

a controller configured to control the switching element according to the error voltage, the controller turning off the switching element when a predetermined ON-time is reached; and a variable reference voltage generator configured to generate the first reference voltage according to the error voltage, wherein the variable reference voltage generator comprises:

an error voltage comparator configured to compare the error voltage with a second reference voltage, and adapted, if the error voltage is greater than the second reference voltage, to provide a switching signal; and a reference voltage switch configured to switch the first reference voltage to a lower reference voltage in response to the switching signal and provide the error amplifier with the lower reference voltage.

2. The switching power source apparatus of claim 1, wherein the error voltage comparator has a hysteresis characteristic in connection with the second reference voltage.

3. The switching power source apparatus of claim 1, further comprising a filter arranged between the controller and the error voltage comparator and configured to delay the error voltage.

4. A switching power source apparatus for ON/OFF-controlling an input AC voltage with a switching element and converting the input AC voltage into a DC voltage that is higher than the AC voltage and is supplied as an output voltage, comprising:

an error amplifier configured to provide an error voltage representative of a difference between the output voltage and a first reference voltage;

a controller configured to control the switching element according to the error voltage, the controller turning off the switching element when a predetermined ON-time is reached; and a variable reference voltage generator configured to generate the first reference voltage according to the error voltage, wherein the variable reference voltage generator comprises:

a voltage/impedance converter configured to change an impedance according to the error voltage; and a voltage generator configured to generate the first reference voltage, which decreases as the error voltage increases, according to the impedance provided by the voltage/impedance converter.

5. The switching power source apparatus of claim 4, further comprising a filter being connected between the controller and the voltage/impedance converter and configured to delay the error voltage.

6. A switching power source apparatus for ON/OFF-controlling an input AC voltage with a switching element and converting the input AC voltage into a DC voltage that is higher than the AC voltage and is supplied as an output voltage, comprising:

an error amplifier configured to provide an error voltage representative of a difference between the output voltage and a first reference voltage;

a controller configured to control the switching element according to the error voltage, the controller turning off the switching element when a predetermined ON-time is reached, wherein the controller turns off the switching element if a charge voltage of a capacitor to which a constant current is supplied exceeds the error voltage, and discharges the capacitor until the switching element is turned on; and a variable reference voltage generator configured to generate the first reference voltage according to the error voltage.

7. A switching power source apparatus for ON/OFF-controlling an input AC voltage with a switching element and converting the input AC voltage into a DC voltage that is higher than the AC voltage and is supplied as an output voltage, comprising:

an error amplifier configured to provide an error voltage representative of a difference between the output voltage and a first reference voltage;

a controller configured to control the switching element according to the error voltage, the controller turning off the switching element when a predetermined ON-time is reached; and a variable reference voltage generator configured to generate the first reference voltage according to the error voltage, wherein the variable reference voltage generator comprises:

a variable resistance element configured to vary a resistance value according to the error voltage; and a potentiometer including a first resistance element and a second resistance element connected in series, configured to generate the first reference voltage, an end of the first resistance element that is not connected to the second resistance element being connected to a third reference voltage, an end of the second resistance element that is not connected to the first resistance element being grounded, the variable resistance element being connected to a part of the second resistance element so as to form a series circuit.

8. The switching power source apparatus of claim 7, wherein the variable resistance is a parallel circuit including a third resistance element and a switching element.

9. The switching power source apparatus of claim 7, wherein the variable resistance element is a voltage/impedance converter to change an impedance according to the error voltage.

10. A switching power source apparatus for ON/OFF-controlling an input AC voltage with a switching element and converting the input AC voltage into a DC voltage that is higher than the AC voltage and is supplied as an output voltage, comprising:

an error amplifier configured to provide an error voltage representative of a difference between the output voltage and a first reference voltage;

a controller consisting of connections to a criticality detection winding, an output diode, a variable reference voltage generator, and the switching element, wherein the controller is configured to control the switching element according to the error voltage, the controller turning off the switching element when a predetermined ON-time is reached; and the variable reference voltage generator is configured to generate the first reference voltage according to the error voltage.

* * * * *